3,828,102
METHOD OF PREPARATION OF TRITIUM-LABELLED PROTEINS
Pierre Fromageot, Le Chesnay, Lam Thanh Hung, Orsaby, and Jean-Louis Morgat, Paris, France, assignors to Commissariat a l'Energie Atomique, Paris, France
Filed Sept. 19, 1972, Ser. No. 290,316
Claims priority, application France, Oct. 1, 1971, 7135529
Int. Cl. A61k 27/04
U.S. Cl. 424—1
12 Claims

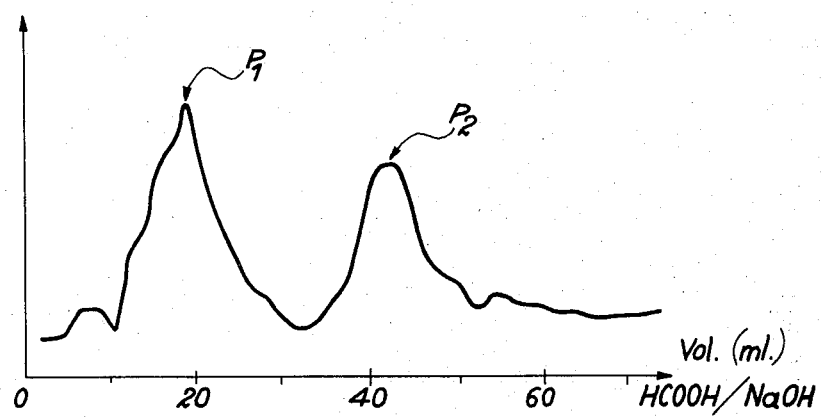
FIG. 1
FIG. 2
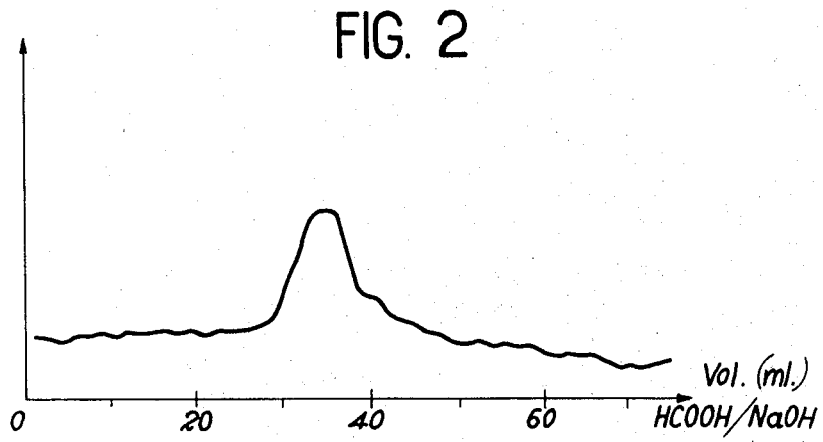

ABSTRACT OF THE DISCLOSURE

The protein to be labelled is protected by complexing with a specific bonding protein so as to form a stable and soluble complex which is subjected to halogenation followed by tritiation, the tritiated complex being then dissociated from the resultant mixture. The tritium-labelled protein and the tritium-labelled bonding protein are extracted successively and selectively.

---

This invention relates to a method of preparation of tritium-labelled proteins.

It is already known that appreciable advantages may be gained by labelling protein or peptide hormones with a radioactive substance in order to determine the exact manner in which these hormones react as well as the mechanism involved in the generation of antibodies and immunological tolerances.

Among other things, it is particularly advantageous to label insulin, which is known for its hormonal effects and its antigenic activity, with a view to carrying out the studies referred-to above. The fineness and accuracy of these investigations entail the need for specific and extensive radioactive labelling of the insulin in order that this latter may be detected at biological dose levels.

Different isotopes are employed in the preparation of labelled hormones: $^{14}C$, $^{35}S$, $^{131}I$, $^{125}I$. However, the hormones which are thus labelled have low specific radioactivity. While it is true that hormones labelled with $^{125}I$ exhibit sufficient specific radioactivity, they nevertheless lose their biological activity above a certain halogenation threshold.

By reason of its chemical and radiochemical advantages over iodine in particular, tritium is the most useful tracer for labelling protein or peptide hormones.

Three methods of introduction of tritium into proteins are known:

the method involving biosynthesis,
the Wilbach method,
specific fixation of tritum on an aromatic residue by catalytic reduction with gaseous tritium of the hormone which has previously been iodized.

The last-mentioned technique is the most widely employed and makes it possible in principle to achieve high specific radioactivities. However, functional groups of the protein considered other than the aromatic residues are liable to react with the halogenation reagents or with the secondary products of catalytic dehalogenation, thereby giving rise to irreversible alteration of the structure and therefore of the biological properties of the protein.

The method of preparation of a tritium-labelled protein in accordance with the invention essentially consists in protecting the protein by inserting this latter in a soluble specific complex which is stable under the conditions of tritiation and is subsequently dissociable. The complexing agent is either a naturally-existing specific bonding protein or a specific antibody which is produced by employing the protein to be tritiated as antigen in a suitable host.

This soluble complex is subjected to halogenation, whereupon the halogenated complex is subjected to tritiation in order to obtain a mixture which is formed of the tritiated complex and of the halogenated complex, the tritiated complex is dissociated and there are then extracted successively and selectively on the one hand the tritium-labelled protein and on the other hand the tritium-labelled bonding protein.

In accordance with one advantageous feature of the method under consideration, the halogenated complex is also dissociated and the halogenated protein is extracted selectively.

The method according to the invention applicable to a number of proteins and among these can be mentioned the peptides.

A clearer understanding of the invention will be obtained from the following description of one mode of execution of the method according to the invention. It will readily be understood that this example is not intended to imply any limitation of the invention.

In the example under consideration, the protein to be labelled is insulin in lyophilized form and containing a small percentage of zinc and the bonding protein is in the form of lyophilized double antibody formed of globulin derived from guinea-pigs and anti-γ-globulin derived from rabbits.

The method is carried out as follows:

5 ml. of insulin in a 0.05M buffer solution of sodium formiate at pH=4 are distributed within ten tubes of plastic material each containing 4.5 ml. of γ-globulin. These mixtures are homogenized and allowed to incubate at 4° C. for a period of three and one-half days. The complex is then cryosublimated to dryness and re-treated in 10 ml. of a 4 mM. buffer solution of phosphate having a pH value of 7.4.

Said 10 ml. of complex (insulin γ-globulin) are filtered through a chromatographic column of the "Sephadex G–100" type which makes it possible to eliminate the excess insulin. The complex discharged from said column can be divided into two fractions: (insulin γ-globulin)$_I$ and (insulin γ-globulin)$_{II}$. These two fractions are concentrated respectively to 5 ml. (10.5 mg. of antibody per ml.) and 6.2 ml. (13.5 mg. of antibody per ml.).

77 mg. of the second fraction of complex (insulin γ-globulin)$_{II}$ as obtained earlier, which represent 0.48 μM. of antibody (molecular weight=160,000), are placed in 6 ml. of a 4 mM. buffer solution of phosphate having a pH of 7.4. The aggregate is maintained at 4° C. in an ice bath and homogenized by magnetic stirring. 48μM. of ICl are then progressively added in solution in 6×20 μl. of CCl$_4$ for a period of 20 min. with magnetic stirring.

Immediately after iodization, the aqueous phase containing the complex and the iodine is filtered through a resin column of the type known as "Biorad-AG–11–A–8" in such manner as to separate the iodized complex (insulin γ-globulin) from the iodine, I$^-$ ions and salts which have formed.

When the iodized complex (insulin γ-globulin) has been desalted and cryosublimated to dryness, the complex is re-treated in 3 ml. of a 0.1M buffer solution of phosphate having a pH value of 8.

A dose of 20 curies of gaseous tritium is then introduced into flasks each containing 1 ml. of iodized complex, 5 mg. of 10% palladium on alumina which performs the function of catalyst and a few beads of "AG–11–A–8" resin which are intended to adsorb the iodide ions. The reaction takes place overnight at room temperature at 0.6 atm. The catalyst is then separated by centrifugation in tubes of cellulose nitrate. A mixture of tritiated complex (insulin γ-globulin) and iodized complex (insulin γ-globulin) is thus obtained.

The unstable atoms $$^3_1H$$

are exchanged by adsorption of the mixture of complexes on a resin of the "IRP 64" type and washing with 336 ml. of 1 volume percent of acetic acid. The iodized and tritiated mixture of complexes is then buffered by eluting with 50 volume percent of acetic acid.

This mixture contains impurities which are released by the resin of type "IRP 64" under the action of the 50% acetic acid. In order to remove said impurities, the mixture of complexes is passed through a chromatographic column of the type known as "Sephadex G–25."

The tritiated complex (insulin γ-globulin) which is obtained at the outlet of the above-mentioned chromatographic column is then dissociated by addition of HCl to a pH value of 2. This dissociation is carried out for a period of 48 hours at 4° C.

Ultrafiltration is then carried out through a membrane of the "Diafloum" type so as to concentrate the dissociated complex to 4 ml. while retaining a constant pH value of 2.

4 ml. of the dissociated tritiated complex (insulin γ-globulin) are then passed down a chromatographic column through a cation exchange resin of the type known as "Sephadex SE–C 25." The tritiated insulin is eluted by a gradient of 200 ml. of 0.05M HCOOH/NaOH and 200 ml. of 0.20M HCOOH/NaOH having a pH value of 4 up to 80 ml. The tritiated γ-globulin is then released by a more highly concentrated gradient of 200 ml. of 0.5M HCOOH/NaOH and 200 ml. of 1M HCOOH/NaOH having a pH value of 4.

The accompanying FIGS. I and II represent respectively the elution of tritiated insulin and the elution of tritiated γ-globulin. The volumes of HCOOH/NaOH in ml. have been plotted as abscissae and the quantities of tritiated insulin and of tritiated γ-globulin obtained during the elution process have been plotted respectively as ordinates.

The two tritiated insulin fractions obtained (corresponding to the peaks $P_1$ and $P_2$ of the curve of FIG. I) are cryosublimated to dryness, then re-treated each in 4 ml. of water. Their pH value is adjusted to 4 by means of a few drops of $$\left(\frac{N}{10}\right) HCOOH.$$

These two fractions of tritiated insulin are finally desalted and lyophilized to dryness. They are re-treated respectively in 4 ml. of water and their pH value is adjusted to 4.

It is also possible to re-treat 0.2 ml. of the iodized complex (antibody-antigen) obtained at the outlet of the chromatographic column of the "Sephadex G–25" type in a 0.1M buffer solution of phosphate having a pH value of 8 and to adjust this latter to 2 ml. by addition of water. The pH is adjusted to 2 by adding a few drops of $(N)H_2SO_4$. Dissociation of the complex takes place at 4° C. over a period of 48 hours. The dissociated complex is cryosublimated to dryness and then re-treated in 1 ml. of water, followed by ultracentrifugation on glycerol. The fractions corresponding to iodized insulin are collected and measured in order to determine the proportion of iodine adsorbed on the complexed insulin.

The method of tritiation of a protein by complexing with a specific bonding protein in accordance with the invention makes it possible to preserve the biological activity of the protein considered. In particular, the production on the one hand of a bio-active tritiated antigen and on the other hand of an immunologically active tritiated antibody will undoubtedly prove to be of great practical value in the field of immunology.

We claim:

1. A method of preparation of a tritium-labelled protein comprising:
   reacting insulin with a bonding protein for said insulin by bringing said insulin and said bonding protein together in solution to form a soluble complex;
   halogenating said complex by adding a halogen-containing compound to the solution to form a halogenated complex;
   introducing gaseous tritium into said solution containing said halogenated complex to form a mixture comprising a tritiated complex and said halogenated complex; and
   adding an acidic compound to said solution containing said tritiated complex to dissociate said tritiated complex into a second mixture of tritium-labelled insulin and tritium-labelled bonding protein.

2. A method of preparation of a tritium-labelled protein comprising:
   reacting a first protein with a bonding protein by bringing said first protein and said bonding protein together in solution to form a soluble complex;
   halogenating said complex by adding a halogen-containing compound to the solution to form a halogenated complex;
   introducing gaseous tritium into said solution containing said halogenated complex to form a mixture comprising a tritiated complex and said halogenated complex; and
   adding an acidic compound to said solution containing said tritiated complex to dissociate said tritiated complex into a second mixture of tritium-labelled protein and tritium-labelled bonding protein.

3. The process of claim 2 additionally comprising separating said tritium-labelled protein from said second mixture.

4. The method of claim 2 wherein the halogenation is an iodization.

5. The method of claim 2 wherein said first protein is an antigen and said bonding protein is a specific antibody of said antigen.

6. The method of claim 5 wherein the antibody is in the form of a lyophilized double antibody formed of γ-globulin derived from guinea pigs and anti-γ-globulin derived from rabbits.

7. The method of claim 2 wherein the dissociation of the tritiated complex is carried out by addition of HCl up to a pH value of 2.

8. The method of claim 3 wherein said separating comprises selective extraction of the tritium-labelled protein and of the tritium-labelled bonding protein by means of chromatography through a column of the type known as "Sephadex–C–25."

9. The method of claim 2 wherein the halogenated complex is dissociated and the halogenated protein is extracted selectively.

10. The method of claim 2 wherein said first protein is a peptide.

11. A tritium-labelled protein as prepared by the method defined by claim 2.

12. A tritium-labelled bonding protein as prepared by the method of claim 2.

(References on following page)

References Cited

UNITED STATES PATENTS

| | | | |
|---|---|---|---|
| 2,011,338 | 11/1959 | Tabern et al. | 424—1 |
| 3,479,154 | 3/1967 | Cardinal | 23—230 B |
| 3,555,143 | 1/1971 | Axen et al. | 424—1 |
| 3,592,888 | 7/1971 | Wolf | 424—1 |
| 3,666,854 | 5/1972 | Eisentraut | 424—1 |
| 3,697,638 | 10/1972 | Hansen | 424—1 |
| 3,709,868 | 1/1973 | Spector | 260—121 |
| 3,720,760 | 3/1973 | Bennich et al. | 424—1 |

FOREIGN PATENTS

| | | |
|---|---|---|
| 1,349,880 | 1964 | France. |
| 2,039,530 | 1/1971 | France. |

OTHER REFERENCES

Colt et al.: Journal of Clinical Endocrinology, 32, pp. 285–7, February 1971.

BENJAMIN R. PADGETT, Primary Examiner

U.S. Cl. X.R.

252—301.1 R; 23—230 B; 260—112.7